US 8,756,237 B2

(12) United States Patent
Stillerman et al.

(10) Patent No.: US 8,756,237 B2
(45) Date of Patent: Jun. 17, 2014

(54) SCALABLE DISTRIBUTED PROCESSING OF RDF DATA

(71) Applicant: Architecture Technology Corporation, Minneapolis, MN (US)

(72) Inventors: Matthew A. Stillerman, Ithaca, NY (US); Robert A. Joyce, Ithaca, NY (US)

(73) Assignee: Architecture Technology Corporation, Minneapolis, MN (US)

(*) Notice: Subject to any disclaimer, the term of this patent is extended or adjusted under 35 U.S.C. 154(b) by 0 days.

(21) Appl. No.: 13/651,235

(22) Filed: Oct. 12, 2012

(65) Prior Publication Data
US 2014/0108414 A1 Apr. 17, 2014

(51) Int. Cl.
*G06F 17/30* (2006.01)

(52) U.S. Cl.
CPC .......... *G06F 17/30* (2013.01); *G06F 17/30312* (2013.01)
USPC ........... 707/741; 707/715; 707/744; 707/770; 707/E17.032

(58) Field of Classification Search
CPC ............... G06F 17/30896; G06F 17/30312; G06F 17/30; G06F 17/30321; G06F 17/30545; G06F 2212/7201; G06F 2212/7209; G06F 12/00; G06F 12/1027; G06F 17/30011; G06F 17/30067; G06F 17/30247; G06F 17/30159; G06F 17/30306; G06F 17/30336; G06F 3/0626
See application file for complete search history.

(56) References Cited

U.S. PATENT DOCUMENTS

| 6,122,628 | A * | 9/2000 | Castelli et al. ........................ 1/1 |
| 6,530,008 | B1 * | 3/2003 | Lin et al. ........................ 711/171 |
| 7,080,081 | B2 * | 7/2006 | Agarwal et al. ............... 707/600 |
| 2004/0044858 | A1 * | 3/2004 | Wong et al. .................... 711/156 |
| 2004/0064693 | A1 * | 4/2004 | Pabla et al. .................... 713/168 |
| 2005/0044331 | A1 * | 2/2005 | Simms ......................... 711/159 |
| 2005/0240577 | A1 * | 10/2005 | Larson et al. ..................... 707/3 |
| 2006/0059173 | A1 * | 3/2006 | Hirsch et al. .................. 707/100 |
| 2006/0074872 | A1 * | 4/2006 | Gordon .............................. 707/3 |
| 2006/0235823 | A1 * | 10/2006 | Chong et al. ..................... 707/1 |
| 2006/0282457 | A1 * | 12/2006 | Williams ...................... 707/102 |
| 2007/0276880 | A1 * | 11/2007 | Lu et al. ........................ 707/203 |
| 2008/0040308 | A1 * | 2/2008 | Ranganathan et al. ........... 707/1 |
| 2009/0077252 | A1 * | 3/2009 | Abdo et al. .................... 709/231 |

(Continued)

OTHER PUBLICATIONS

Mnemosyne, downloaded from "http://www.erlang.org/documentation/doc-5.1/lib/mnemosyne-1.2.5/doc/html/Mnesia_chap6.html", Ericsson Utvecklings AB, copyright 2001.*

*Primary Examiner* — Neveen Abel Jalil
*Assistant Examiner* — Kristofer Biskeborn
(74) *Attorney, Agent, or Firm* — Shumaker & Sieffert, P.A.

(57) ABSTRACT

In general, techniques are described for an RDF (Resource Description Framework) database system which can scale to huge size for realistic data sets of practical interest. In some examples, a database system includes a Resource Description Framework (RDF) database that stores a plurality of data chunks to one or more storage drives, wherein each of the plurality of data chunks includes a plurality of triples of the RDF database. The database system also includes a working memory, a query interface that receives a query for the RDF database, a SPARQL engine that identifies a subset of the data chunks relevant to the query, and an index interface that includes one or more bulk loaders that load the subset of the data chunks to the working memory. The SPARQL engine executes the query only against triples included within the loaded subset of the data chunks to obtain a query result.

20 Claims, 4 Drawing Sheets

(56) References Cited

U.S. PATENT DOCUMENTS

| | | | |
|---|---|---|---|
| 2009/0138437 A1* | 5/2009 | Krishnamoorthy et al. | 707/3 |
| 2010/0030725 A1* | 2/2010 | Mendis et al. | 707/1 |
| 2010/0036862 A1* | 2/2010 | Das et al. | 707/101 |
| 2010/0198829 A1* | 8/2010 | Elzinga | 707/741 |
| 2010/0199109 A1* | 8/2010 | Terek et al. | 713/194 |
| 2010/0332457 A1* | 12/2010 | Graefe | 707/673 |
| 2011/0040810 A1* | 2/2011 | Kaplan et al. | 707/822 |
| 2011/0099173 A1* | 4/2011 | Chappell et al. | 707/741 |
| 2011/0145534 A1* | 6/2011 | Factor et al. | 711/170 |
| 2011/0153577 A1* | 6/2011 | Dean et al. | 707/693 |
| 2011/0196900 A1* | 8/2011 | Drobychev et al. | 707/812 |
| 2011/0218972 A1* | 9/2011 | Tofano | 707/692 |

* cited by examiner

SCALABLE DISTRIBUTED PROCESSING OF RDF DATA

TECHNICAL FIELD

The invention relates to databases and, more specifically, to querying RDF databases.

BACKGROUND

The Resource Description Framework (RDF) is a data model that is one of the core technologies of the Semantic Web. RDF data represents a labeled directed graph, with the labels applied to both nodes and arcs. RDF data is currently stored in triple-stores, where the unit of storage is a single subject-predicate-object triple. An index of triples is used to satisfy queries in the SPARQL Protocol and RDF Query Language (SPARQL) language by a series of "joins" in which triples that match each part of the query are assembled into an overall answer.

A SPARQL query, in its most basic form, is a graph pattern—a small labeled directed graph, with some of the nodes and arcs labeled with variables. The query seeks one, some, or all subgraphs of the RDF graph that match the pattern. Matching means that the subgraph is isomorphic to the pattern as a directed graph, and that the pattern labels (other than variables) match the corresponding graph labels. For each match, the pattern variables take on the value of the corresponding RDF graph label, thus providing one answer.

Each arc in RDF is labeled with a Uniform Resource Identifier (URI). Each node is labeled with either a URI or a value from one of a set of standard types. Nodes can also be "blank" i.e., unlabeled. URIs are used to unambiguously name resources, which can be almost anything. Each arc in the RDF graph is uniquely specified by its three labels, at the tail, on the arc, and at the head. These are called the subject, the predicate, and the object, respectively (sometimes abbreviated S, P, and O, and always given in that order). These three labels together are a triple. An RDF graph may be uniquely represented by the set of its triples. Each triple (S, P, O) is a proposition, stating that S stands in relation P to O.

Two RDF graphs may be merged to form a new graph. The merged graph consists of (roughly) the union of the triples from the two constituent graphs. If each of the constituent graphs contains a node with the same URI label, then, that node will appear just once in the merged graph. This makes sense, since the URI is supposed to have the same unambiguous meaning wherever it appears.

RDF is associated with a theory of types, subtypes, and containers called RDF Schema (RDFS). Using RDFS, nodes can be assigned a type, and types can be given subtypes. Predicates (the labels of arcs) are also typed by assigning a domain and a range, each of which are types for the subject and object respectively. Sometimes, when only some of the types of nodes are given, it is possible to infer the missing types. This is called RDFS inference. Many SPARQL query engines can be set to automatically perform RDFS inference, in effect, behaving as if there are some additional type-asserting triples in the RDF graph.

OWL (Web Ontology Language) is a more elaborate language for describing RDF, in which a much richer set of things may be expressed. Again, many SPARQL engines can be set to perform OWL inference by behaving as if the missing but inferred OWL triples are actually present in the RDF graph.

Conventional RDF database systems (often called "triple stores") treat the RDF graph (data) as a large set of triples. These triples are individually indexed. The index is divided into three parts, with each triple represented by an entry in each part of the index. In each of the three parts, the subject, predicate, and object labels, as a triple, are sorted lexicographically and stored in a B+ tree or a similar data structure that supports range queries. The difference between the three parts is that the order in which the three parts of the triple are considered for lexicographic sorting is different. Although there are six possible permutations of S, P, and O, only three of them are needed for full functionality.

To look up a pattern for a single triple, such as (a, ?x, b) where a and b are labels and ?x is a variable, the system will consult the part of the index in which the lexicographic ordering is (S, O, P) or (O, S, P), only one of which will be present. Suppose the (S, O, P) lexicographic ordering is present. The system will consult that index to find the first entry beginning with (a, b). All of the entries beginning with (a, b) will be adjacent in the index, and can be rapidly returned. Each of those represents a triple of the form (a, ?x, b). To find matches for patterns with two variables, such as (a, ?x, ?y), the same (S, O, P) part of the index would be used, but now searching for the first entry with prefix (a) and following entries.

More complex patterns (called Basic Graph Patterns or BGPs in the SPARQL literature) consist of multiple triples. To satisfy these, the SPARQL query engine begins by looking up one of the triples in the pattern. Each match induces a set of values (labels) for the variables occurring in that triple. The SPARQL engine then processes a second pattern triple, applying each valuation to that triple, and then searching for the resulting pattern. Here is an example pattern with two triples:

(a, ?x, ?y) (?y, r, ?z).

Suppose there are two matches for the first of these triples:

(a, s, b) and (a, t, c).

This establishes two valuations:

?x=s, ?y=b, and
?x=t, ?y=c.

Applying the first of these valuations to the second triple yields:

(b, r, ?z).

Looking this up in the index, suppose there are two answers:

(b, r, z1) and (b, r, z2).

There are therefore two answers for the overall query:

(a, s, b) (b, r, z1) and (a, s, b) (b, r, z2).

The typical RDF database system repeats the process using the second valuation, possibly finding some additional matches, each of which yields an answer to the overall query. In this small example, the RDF database system consults the index three times: Once to find matches for the first triple, and then once for each of the two matches found.

The typical RDF database system effectively computes a "join" between the sets of matches for each of the triples in the pattern. A typical RDF database system uses here a strategy for this join that is known as "indexed nested loop." For more complex patterns, the loop nesting will be deeper, and the number of total iterations can be quite large. The number of iterations, and thus the number of times the index must be consulted, can be quite sensitive to the order in which the pattern triples are nested. For complex queries, these joins are prohibitively expensive, especially as the size of the database grows.

In some cases, the index is divided into parts, each of which is assigned to a different host. The results from each outer loop index lookup are passed in, one at a time, to affect the iterations of the inner loop, at each level of nesting. Even if the outer-loop results are all adjacent to one another in the index, and thus likely on the same host, each iteration of the inner loop may require consulting the index on a distinct host. Thus, for N outer-loop results, roughly N+1 index hosts will be involved, with N inter-host communication events. The cost of such communication between distributed hosts, particularly for deeply nested queries, can dwarf the other costs in this query handling strategy.

Enterprises are facing a deluge of data as the rate of production from sensors and other sources increases exponentially. Timely processing and analysis of this data will be essential for the success of future enterprise operations. Much of this data is heterogeneous, semi-structured, and incomplete or non-standard, making its storage and handling awkward and inefficient. The Resource Description Framework (RDF), the primary technology of the Semantic Web, is an ideal tool for representing such data in a uniform, tractable way, with the elegant SPARQL query language providing a powerful means of retrieving and processing the data. Unfortunately, current RDF technology does not provide the necessary performance for storage and query at very large scales.

SUMMARY

In general, techniques are described for an RDF (Resource Description Framework) database system which can scale significantly in size for realistic data sets of practical interest, i.e., enabling the persistent storage of very large RDF graphs and the rapid satisfaction of queries. The RDF database system may leverage a variety of platform architectures including IaaS (Infrastructure-as-a-Service) clouds and heterogeneous distributed computing systems. Further, techniques are described herein for reproducing the capabilities of SPARQL queries, to the extent practical, but for very large scale RDF data, and with an architecture that is "friendly" to distributed processing.

The scale of data from sensors and other sources is increasing exponentially. The anticipated scale of such data threatens to overwhelm processing capabilities including, crucially, storage and retrieval, thereby preventing timely exploitation of the data. This problem is exacerbated by the heterogeneous, semi-structured nature of the data which makes conventional Relational Database Management System (RDBMS) storage awkward and inefficient. However, such data can be seamlessly expressed in RDF, one of the core technologies of the Semantic Web, and thus RDF storage and SPARQL querying is a natural way to handle this difficult data. The RDF database system described herein may enable data storage and querying in RDF form at the anticipated scale with sufficient query performance versus conventional RDF databases.

In some examples, the RDF database system stores RDF in overlapping chunks, much larger than one triple, and indexes them with multiple indexes that are tailored to the domain and query load. Chunks that overlap have at least one triple in common, i.e., some of the triples may be stored in multiple chunks. The RDF database system queries by retrieving selected chunks using the indexes and then applying conventional SPARQL querying to the resulting modestly-sized RDF graph in memory. Each chunk of RDF may be stored as a binary data block of variable size that is reconstituted as an in-memory RDF graph and merged with other such graphs before being queried. The binary data block is in a format that concisely captures the RDF content and can rapidly be reconstituted. In addition, the techniques may include extensions to SPARQL that makes use efficient use of the RDF database system described herein.

The techniques may further include application of a scripting language, referred to hereinafter as Mnemosyne Query Language (MQL), that specifies an ordering of parameterized steps by which the RDF database system retrieves chunks from storage for placement to working memory, performs SPARQL queries on relevant in-memory RDF sub-graphs, and optionally, iteratively retrieves additional chunks for additional SPARQL queries according to the results of one or more prior SPARQL queries. MQL scripts may additionally, after each of these partial queries, specify the partial or whole clearing of working memory to provide working memory space for additional chunks for subsequent steps.

In one example, a method comprises receiving, with a database system, a query for a Resource Description Framework (RDF) database that stores a plurality of data chunks to one or more storage drives, wherein each of the plurality of data chunks includes a plurality of triples of the RDF database. The method further comprises identifying a subset of the data chunks relevant to the query; loading the subset of the data chunks to a main memory associated with the database system; and executing the query only against triples included within the subset of the data chunks loaded to the main memory to obtain a query result.

In another example, a database system includes a Resource Description Framework (RDF) database that stores a plurality of data chunks to one or more storage drives, wherein each of the plurality of data chunks includes a plurality of triples of the RDF database. The database system also includes a working memory, a query interface that receives a query for the RDF database, a SPARQL engine that identifies a subset of the data chunks relevant to the query, and an index interface that includes one or more bulk loaders that load the subset of the data chunks to the working memory. The SPARQL engine executes the query only against triples included within the loaded subset of the data chunks to obtain a query result.

The details of one or more examples of the disclosure are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
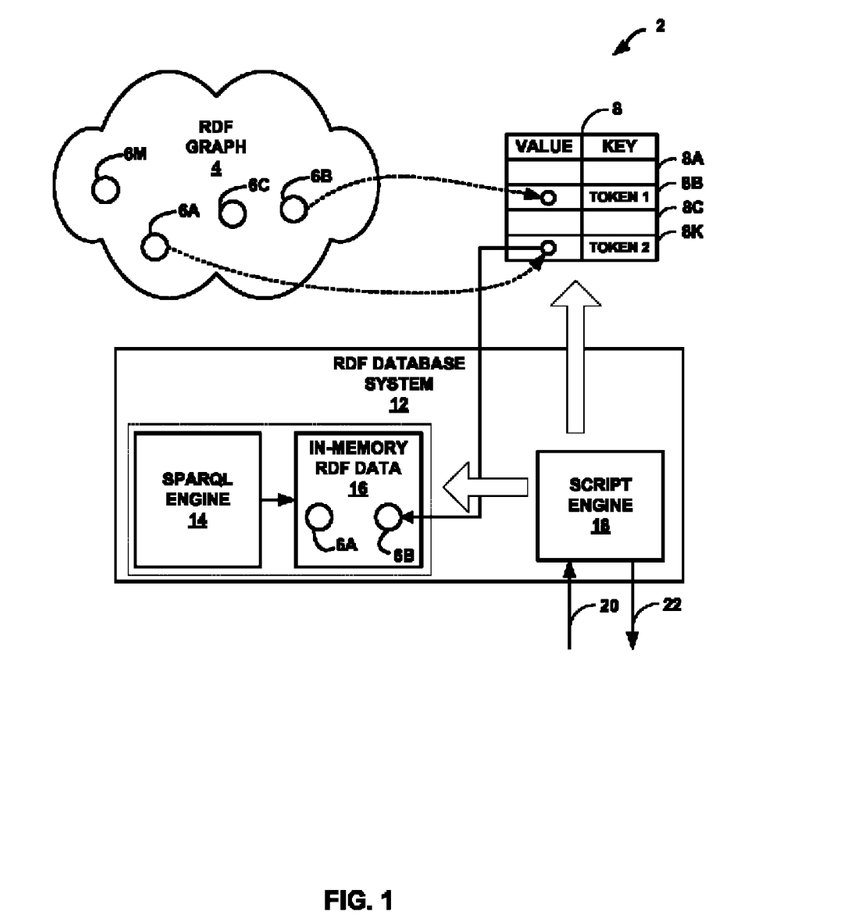
FIG. 1 is a block diagram illustrating an example of an RDF database system that accords with techniques described in this disclosure.

FIG. 1 is a block diagram illustrating an example system 2, including a novel RDF database system 12 architecture described herein, that can provide scalable storage and query performance on IaaS (Infrastructure-as-a-Service) clouds and heterogeneous distributed computing platforms. Two innovative aspects of the RDF database system 12 architecture are primarily responsible for its scalability: (1) the manner of RDF storage and indexing, and (2) the manner of query processing. RDF database system 12 may in some instances also take advantage of distributed computing environments in order to make cost-effective and flexible use of computing resources, such as IaaS cloud facilities.

The RDF database is conceptually illustrated in FIG. 1 as RDF graph 4. The totality of the RDF data (again, illustrated as conceptual RDF graph 4) describes a large directed labeled graph. RDF graph 4 may include one or more connected components that each consists of all nodes and arcs that can be reached starting from a single node of the connected component by an undirected path in the graph, thus forming a partition of RDF graph 4.

RDF database system 12 stores the RDF data as one or more chunks 6A-6M (collectively, "chunks 6"), each of which is encoded as a binary data block that is accessible from index 8. Each of chunks 6 represents a subgraph of the collection of RDF triples of an RDF database that constitute RDF graph 4, i.e., the large directed labeled graph described by the totality of the RDF data.

Chunks 6 each include at least two RDF triples of RDF graph 4 and thus represent fragments of RDF data that correspond to functional units of information. Each of chunks 6 includes RDF triples that represent a small subgraph of RDF graph 4 and contains those arcs and nodes that pertain to a particular topic. The union of all of chunks 6, appropriately merged, will be the original RDF graph 4. RDF database system 12 may be stored in a concise binary form. Each of chunks 6 may be associated with a locally unique identifier.

Index 8 represents an associative data structure having one or more index entries 8A-8K (collectively, "index entries 8"). Each of index entries 8 includes a key-value pair that maps the value to the key. The value of each of index entries 8 provides access to a binary data block that encodes one of chunks 6. The value may correspond to a chunk identifier, a file handle, a URI/URL, or other reference by which RDF database system 12 may load the corresponding one of chunks 6 to in-memory RDF data 16 of RDF database system 12. Chunk storage may be a separate function and index 6 may refer to the chunk through an extra level of indirection. As a result, multiple index entries (from the same or multiple indexes) may all refer to the same chunk.

For example, under the direction of script engine 18 executing a script, RDF database system 12 retrieves one of more of chunks 6 using index 8 and reconstitutes the retrieved chunks 6 as in-memory RDF data 16 in working memory of SPARQL engine 14 of RDF database system 12. SPARQL engine 14 may then execute SQARQL queries against in-memory RDF data 16 to obtain and return SPARQL query results.

In the illustrated example, script engine 18 receives a script 20 by an external interface and executes script 20. Elements of script 20 execution include identifying index entries 8B, 8K as including keys (respectively, "Token 1" and "Token 2") relevant to an overall query represented by script 20. Script engine 18 retrieves chunks 6A, 6B accessible by values of index entries 8B, 8K and loads chunks 6A, 6B to in-memory RDF data 16. Script engine 18 provides a SPARQL query to SPARQL engine 14, which executes the SPARQL query against in-memory RDF data 16 to obtain a query result 22. Script engine 22 returns the query result 22 responsive to script 20 via the external interface.

Query processing in accordance with techniques described herein consists of a combination of gather, sift, and clear steps controlled by a script. A gather step retrieves RDF chunks into in-memory RDF data 16. A sift step is the application, by SPARQL engine 14, of a SPARQL query on the in-memory RDF data 16. A clear step directs RDF database system 12 to selectively remove the triples from in-memory RDF data 16. To gather the appropriate chunks, RDF database system 12 queries in index 8 to find the chunks of interest. In contrast to conventional RDF database systems, in which the RDF data is stored and indexed in small units called "triples," the techniques as applied by RDF database system 12 as described herein may decrease the granularity with which RDF data is indexed and loaded to main memory for processing. Again, in order to match a complex pattern, conventional RDF database systems consult the index many times and "join" the result-sets. This is typically done with deeply nested loops, with the innermost loop experiencing many iterations. The large number of joins needed will be particularly expensive for distributed databases because of the cost of communications.

As described herein, RDF database system 12 in conjunction with MQL replaces a very general, one-size-fits-all index with a topic- or domain-specific customization that may provide scalable performance. The RDF database system provides a framework in which domain-specific indexes, query strategies, and even chunk boundaries can be deployed. The RDF database system may be agnostic about the technology behind the indexes (and other components) incorporated into the system. This flexibility will enable the RDF database system to take advantage of the native capabilities of the platform it is running on, such as an IaaS cloud or an asymmetric computing cluster.

Once the basic infrastructure is in place and proven, researchers can develop new kinds of indexes, new idioms for organizing such databases, and new strategies for query satisfaction. There will be an incentive for performance models to be refined, and query planning and optimization to be automated—all potentially hard research problems. The RDF database system and MQL are opens up this new realm of possibilities by breaking the logjam that has prevented large-scale applications of RDF.

Figure 2:
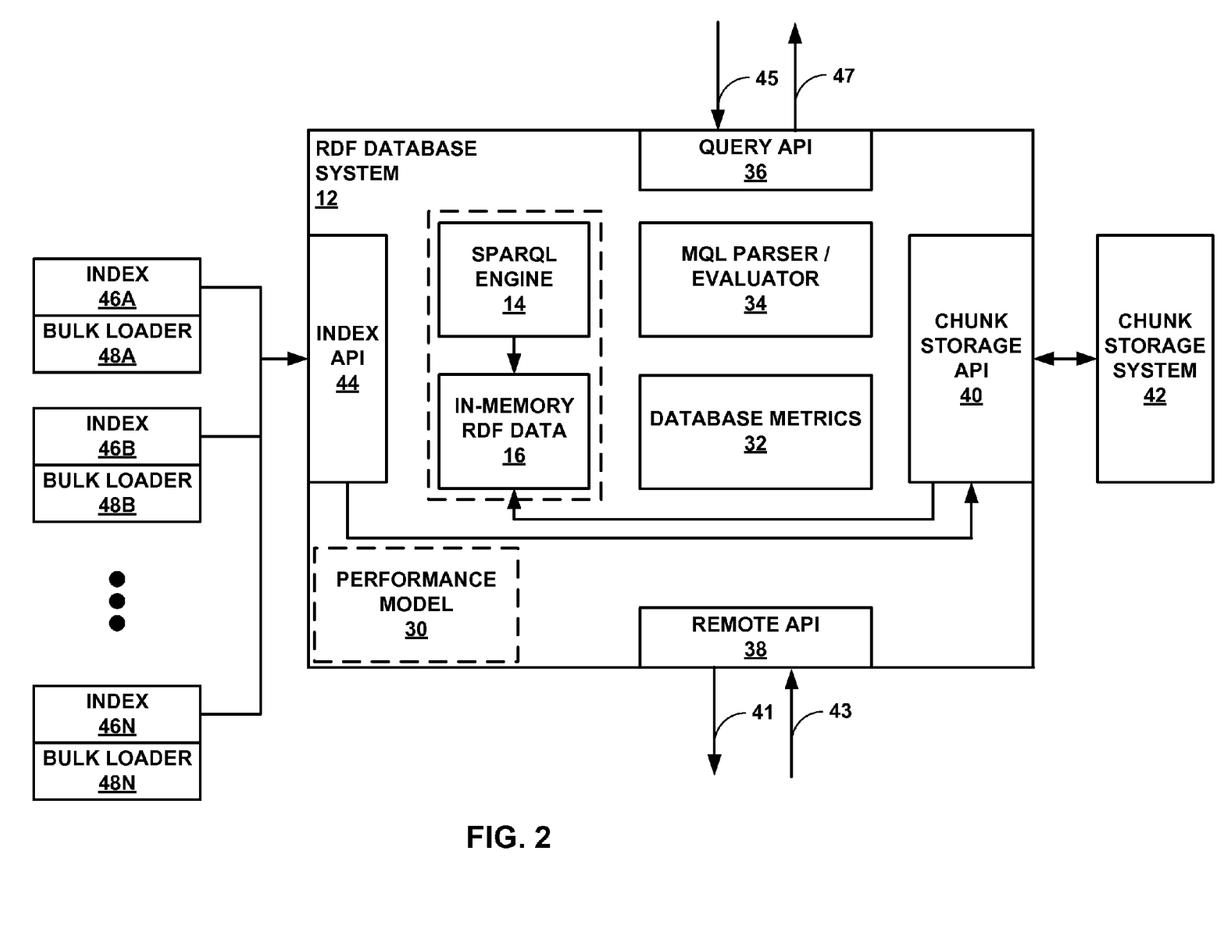
FIG. 2 is a block diagram illustrating an example RDF database system architecture that accords with techniques described in this disclosure.

FIG. 2 is a block diagram illustrating an example RDF database system architecture that accords with techniques described in this disclosure. RDF database system 12 of FIG. 2 may represent an example instance of RDF database system 12 of FIG. 1. In accordance with the described techniques, and as described in further detail below, rather than performing SPARQL queries on the entirety of an RDF graph at once, RDF database system 12 cycles modest "chunks" of RDF into working memory, in appropriate combinations, and then performs a partial query for the SPARQL query on each of the in-memory graphs cycled in. After each of these partial queries, RDF database system 12 partially or wholly clears the working memory to make room for the next chunk. RDF database system 12 communicates with indexes 46A-46N (collectively, "indexes 46") by an Index Application Programming Interface (API) 44 that includes functions for obtaining values for corresponding keys. Each of indexes 46 may represent an example instance of index 8 of FIG. 1. In this example, each of indexes 46 corresponds to one of bulk loaders 48A-48N (collectively, "bulk loaders 48"). Each of indexes 46 is capable of returning identifiers for RDF chunks meeting specific requirements specified in a script or in a query result, for example. Each of bulk loaders 48 is capable of populating the corresponding one of indexes 46 from scratch effectively and efficiently. For example, each of bulk loaders 48 may include a file handle or URI to the corresponding one of indexes 46 stored to disk. Indexes 46 may be stored to one or more hosts remote from RDF database system 12 but connected to RDF database system 12 by a network. Consequently, communication by index API 44 with indexes 46 may introduce network-related latency to queries.

Each of indexes 46 includes one or more index entries that store key-value pairs. In other words, multiple configurable indexes 46 associate "key" data to each chunk. Thus, a chunk may be said to be "about", "related to", and/or "relevant to" an associated key. Each of the configurable indexes 46 will record some different significant aspect of the chunks' subject matter or other metadata. Indexes 46 thus enable RDF database system 12 to rapidly and efficiently retrieve chunks that are about any given topic or combination of topics expressed by the keys. To avoid storing each chunk multiple times, indexes 46 may associate keys to chunk identifiers. Then multiple different indexes 46 can refer to the same stored chunk via its identifier. In addition, for instance, a single one of indexes 46 may include multiple index entries having different keys that each refer to the same chunk.

Indexes 46 may be implemented using different types of indexing technologies, so long as indexes 46 are accessible by index API 44. Different types of index, including off-the-shelf components, may be used simultaneously for different indexes. For example, conventional relational database (RDBMS) tables and indexes may be represented by index 46A. Alternatively, one of the NoSQL indexes, which may be tailored for use in cloud computing and have relaxed consistency guarantees (e.g., Cassandra™), may be represented by index 46B. As another example, index 46N may represent a Dynamo™ index.

RDF database system 12 updates indexes 46 incrementally as chunks are added to chunk storage system 42 or updated. New indexes can be added to indexes 46 by using a corresponding bulk-load capability that examines all chunks (or all that are relevant). The same bulk-load function could also be used to reconfigure the chunks (the RDF subgraphs) themselves in order to make the chunk divisions more convenient for the query load. Just as indexes 46 may be plugged into the RDF database system in the component model described herein, corresponding bulk-loaders 48 (which are typically specific to a type of index) may also be plugged in.

RDF database system 12 communicates with chunk storage system 42 by a chunk storage API 40 that provides methods for loading chunks (e.g., chunks 6 of FIG. 1) from persistent storage (e.g., a disk local to RDF database system 12), a host server, or other storage location to in-memory RDF data 16. Chunk storage API 40 may provide additional methods for storing RDF chunks as binary data blocks of variable size that can be reconstituted as an in-memory RDF graph and merged with other such graphs before being queried. In this way, chunk storage functionality of RDF database system 12 is, in this example, designed as a plug-in component in order to enable systems to be configured with alternatives that offer different guarantees, or that take advantage of native storage mechanisms of a cloud platform.

In accordance with the techniques described herein, query processing by RDF database system 12 is a sequence of "gather," "sift," and "clear" steps orchestrated by a script. This script, which must be supplied by the requestor, is written in what is referred to hereinafter as Mnemosyne Query Language (MQL). As described in further detail below, the three steps may be parameterized, and an MQL script may include many instances of each step. The three step types executed in MQL scripts are described in the context of RDF database system 12 as follows:

Gather

RDF database system 12 queries indexes 46 by index API 44 and retrieves, from chunk storage system 42 by chunk storage API 40, relevant chunks of RDF data in binary form and reconstitutes the relevant chunks in in-memory RDF data 16 for local SPARQL engine 14. This causes a merge with any previously gathered RDF (In effect a kind of database join is thereby computed.). Chunk retrieval is specified in terms of the one of indexes 46 to use and the corresponding key value or key range to look up. The key value/range may be an expression native to the specified index. MQL provides the capability to specify these expressions as templates—strings with variables that will be replaced with values derived from the results of earlier steps or with values supplied by the MQL script. The MQL script specifies (e.g., as computer code) the computation that converts the results of earlier sift operations into values to be substituted into gather templates. A gather step may be indicated in an MQL script by a "GATHER" token.

In one example syntax, gather (<IndexID>, <selector>) returns an <iterator>. In the above declaration, IndexID names a particular one of indexes 46 to search. Selector is a string specifying the keys to search for in a format that is specific to the index. The iterator, with each iteration, returns the key found and also loads the corresponding RDF chunk into working memory. As a result, code in this style may sift from each matching chunk:

for(key:gather(someIndex,someSelector)){sift
 (< ... key ... >) clear (< ... key ... >) }

Sift

SPARQL engine 14 applies a conventional SPARQL query to evaluate the RDF in in-memory RDF data 16. The result may be part of the final answer, or it may be an intermediate result. As with gather, the SPARQL expression embedded within MQL may be a template into which values from earlier steps will be substituted. A sift step may be indicated in an MQL script by a "SIFT" token.

In one example syntax, sift (<SPARQL-SELECT-query>) returns an <iterator>. The SPARQL query in this operation is restricted to a SELECT or SELECT DISTINCT, which returns an n-tuple of values for each matching subgraph in the working memory. The iterator, with each iteration, returns one of these n-tuples.

Clear

RDF database system 12 clears some of the RDF triples in in-memory RDF data 16 to make space for additional gathering. The design of this feature may depend on the particular SPARQL engine 14 incorporated into RDF database system 12. SPARQL engine 14 may in some instances be based on the ARQ Engine for Apache Jena™. In some instances, RDF database system 12 uses Named Graphs or some other native method of labeling sets of triples to permit later deletion. Alternatively, RDF database system 12 may incorporate a mechanism for specifying a SPARQL query whose answers are to be deleted. A clear step may be indicated in an MQL script by a "CLEAR" token.

In one example syntax, clear (<SPARQL-SELECT-query>) returns <status>. The SPARQL query in this operation is restricted, as with the sift operation. The effect is to delete from working memory the entire matching subgraph, for each match. The returned status indicates the number of matches removed, or an error condition.

MQL links gather, sift, and clear steps together in various patterns with a scripting language. The scripting language may in some examples be a data flow language, for the Mnemosyne evaluation will, to a large extent, have sift steps whose output is used to control subsequent steps (of all kinds), leading naturally to a pipelined implementation.

MQL queries, e.g., MQL query 45, arrive via query API 36 to be processed by MQL Parser/Evaluator 34. MQL Parser/Evaluator 34 may represent an interpreter for the MQL language. MQL Parser/Evaluator 34 may be adapted from an existing interpreter for, e.g., the Python scripting language, VBScript, or other scripting language that is a basis for MQL.

A database metrics 32 component maintains running totals of the number of triples of various kinds that are in the database. RDF database system 12 uses these metrics to estimate the number of results a query will have. Such estimates, together with a performance model 30 component, can in some cases provide inputs to a query plan optimizer. In some instances, performance model 30 may implement a mathematical performance model based on measured performance of RDF database system 12.

Performance model 30 for RDF database system 12 may also provide an estimate of the time and resources to process a specified query given the sizes of all of the intermediate results. A database metrics 32 subsystem for RDF database system 12 may provide a rough estimate of the size of results (and thus, of intermediate results). An invoker of RDF database system 12 could receive an estimate of the time or processing resources needed to satisfy their query and may therefore be provided, by query API 36, with the opportunity to skip or alter a query that is too expensive.

Because MQL queries are more like query plans in that they specify how the answer is to be obtained, in some instances, RDF database system 12 incorporates an automated query planner and optimizer. Queries specified in some more declarative form may be compiled by MQL Parser/Evaluation 34 into MQL for evaluation. Such compilers may use heuristics to propose a set of correct query plans and then select the one whose predicted performance is the best. Thus, database metrics 32 and performance model 30 may be a natural starting point for the development of such a compiler.

As described thus far, RDF database system 12 communicates with indexes 46 and chunk storage system 42 that may be implemented in a distributed manner. For example, chunk storage system 42 or one of indexes 46 may be implemented using the Cassandra™ distributed database. In some examples, remote API 38 includes methods by which fragments of MQL may be sent to a separate, remote instance of RDF database system 12 with the results being streamed back. In the illustrated example, RDF database system 12 issues MQL fragment 41 (a "query fragment") by remote API 38 and receives MQL result 43 (a "query result fragment") in return. Each instance of RDF database system 12 may have distinct indexes, but one or more instances may share the chunk storage. These techniques may support database strategies such as replication, federation, parallel evaluation, and query load sharing.

As a result, one of the more advanced adaptations for distributed processing will be to specify an MQL fragment to be evaluated remotely, either to spread the processing load to additional hosts, or to move the computation closer to the data to reduce communication. MQL may include syntax to describe such excursions and to specify how they are to be carried out. In some examples, MQL includes syntax directing the results be streamed back as they are generated. In some examples, MQL includes syntax directing the results be sent back in a batch when they are all ready. Remote evaluation may in some examples proceed in parallel with other parts of computation.

RDF database system 12 may provide for cloud computing and distributed computing. RDF database system 12 may provide for remote invocation via query API 36, with a particular focus on its use in systems with federated and replicated databases. RDF database system 12 may support fault tolerance and elasticity. With regard to fault tolerance, MQL scripts may contain checkpointing of intermediate results, explicitly check for the failure of steps, and be restarted. Thus, the strategy for fault-tolerance may be different for each query, implementing a different tradeoff between cost, performance, and safety.

RDF database system 12 may provide for various methods of inference. Using forward-chaining inference, RDF database system 12 infers additional RDF triples implied by the data and add these to the RDF chunks, either augmenting existing chunks or creating fresh chunks that contain just the inferred triples. Most SPARQL engines, including Jena™, implement backward-chaining inference transparently during querying. SPARQL engine 14 may apply inference capabilities of the underlying SPARQL engine during sift steps of MQL scripts.

Figure 3:
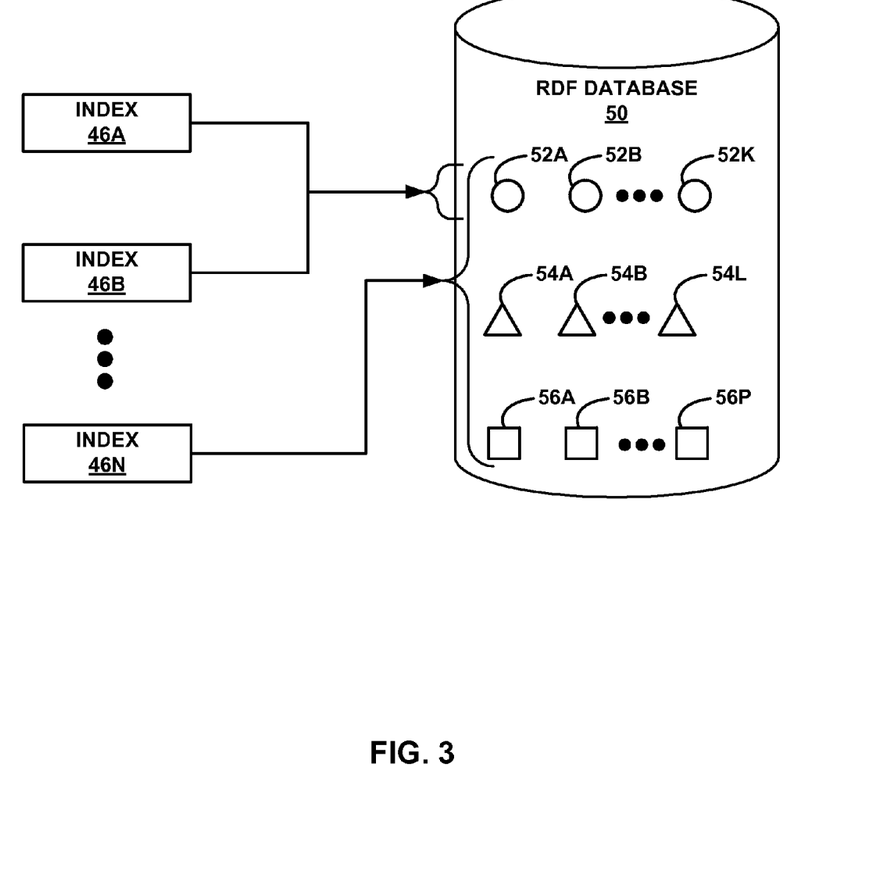
FIG. 3 is a block diagram illustrating an example RDF database having chunks indexed by a plurality of indexes in accordance with techniques described herein.

FIG. 3 is a block diagram illustrating an example RDF database having chunks indexed by a plurality of indexes in accordance with techniques described herein. In the illustrated example, RDF database 50 may be an enterprise database having triples regarding people (customers and employees), companies, purchases, and products. The RDF graph constituting RDF database 50 is divided into a plurality of chunks related to ("about") each person, each company, each product, and each purchase event. For example, chunks 52A-52K (collectively, "chunks 52") may each relate to a different person. Chunks 54A-54L (collectively, "chunks 54") may each relate to a different company. Chunks 56A-56P (collectively, "chunks 56") may each relate to different products. Additional chunks not illustrated for simplicity may relate to other items (e.g., purchases).

Chunks 52, 54, and 56 are indexed by indexes 46. For example, index 46A may associates (key) a name with each of chunks 52 related to a person. As another example, index 46B may associate an age with each of chunks 52 related to a person. A chunk relating to a purchase would be associated (by two indexes of indexes 46) with a person (e.g., a customer) and one or more products. One or more of indexes 46 can also record metadata about the chunks. For instance, for each of chunks 52, 54, and 56, the date on which it was the chunk is created may be recorded in one of indexes 46.

In one example, the Mnemosyne-capable RDF database 50 is deployed on Amazon Web Services (AWS). Individual chunks of chunks 52, 54, and 56 may be stored as AWS Simple Storage Service (S3) objects with the name of the object being the identifier for the chunk. Some of indexes 46 (e.g., the larger ones) may be implemented as AWS DynamoDB databases. Others of indexes 46 may be implemented as conventional RDBMS tables on a single cloud host. RDF database system 12 of FIGS. 1-2 ties indexes 46 together via its plug-in architecture.

As described above with respect to FIGS. 1-2, one of the core components of RDF database system 12 (a Mnemosyne query processor) is a conventional SPARQL query processor (represented by SPARQL engine 14). However, RDF database system 12 uses SPARQL engine 14 to process in-memory RDF graphs, which must be of modest size so that they can fit in main memory. The binary form of stored RDF chunks is engineered so that a chunk can be rapidly and efficiently merged into the in-memory RDF graph of the SPARQL processor.

A Mnemosyne query is a "recipe" for retrieving some of chunks 52, 54, and/or 56 using indexes 46, merging the chunks into the SPARQL engine 14 working memory, then running a conventional SPARQL query on the accumulated RDF graph (in-memory RDF data 16) in working memory, and then finally clearing out some of the working memory to make some space. The recipe consists of the cycle, possibly repeated many times, and is orchestrated by a script that describes how the results of each cycle will be used to invoke and control the subsequent cycles.

A Mnemosyne query is written in a scripting language called Mnemosyne Query Language (MQL). MQL may include a convention scripting language extended to include the three new primitive operations, gather, sift, and clear described above.

Gather steps find selected RDF chunks using the indexes, retrieve them from storage, and place them in the working memory of SPARQL engine 14. Sift steps direct SPARQL engine 14 to run a conventional SPARQL query on the RDF that has accumulated in working memory (in-memory RDF data 16). Finally, clear steps remove some or all of the RDF from working memory to make space for more gathering. For each of these primitive operations, parameters control its function. In the case of gather, parameters determine which of indexes 46 will be searched, and which keys will be searched for. The parameters of sift include a SPARQL query expression. The parameters of clear specifies which RDF triples should be cleared from working memory. Because these parameters are supplied by the script (i.e., they are computed), they provide a means for the results of earlier operations to influence later operations.

For example, using the data described above for an enterprise, a query may request employees of company "C" who have purchased products from their own company. This query may be scripted in MQL to be performed by RDF database system 12 in the following manner:

(1) GATHER: Use the index of companies by name (i.e., that maps company names as keys to RDF chunks pertaining to companies) to find the chunks pertaining to company C. In the illustrated example, index 46N includes keys that relate to at least one of each of chunks 52, 54, and 56. Thus, index 46N may in this example include keys that relate to company employees, products, customers, and/or purchases.

(2) CLEAR: Each company's RDF chunks include a list of the company's products. In this step, remove all of the loaded RDF, except for the list of the company's products.

(3) GATHER: Use one of indexes 46 that indexes employees by employer by mapping an employer (key) to a list of employees (chunks). RDF database system 12 finds and loads all of the chunks for each employee of company C. As each of these employee chunks is loaded, perform steps (4)-(7) for each of the employee chunks:

(4) SIFT: Use SPARQL to extract the URI (the label) of the employee.

(5) GATHER: Use one of indexes 46 that indexes purchases by customer to find and load all purchases where the customer is the URI from step (4).

(6) SIFT: Use SPARQL to find purchases among those loaded into working memory of SPARQL engine 14, where the product is one of those found in step (1) and preserved in step (2). For each of these, return the employee's name (loaded as part of an employee chunk in step (3)).

(7) CLEAR: Remove all of the RDF about the employee and about the employee's purchases from the SPARQL processor's working memory. Leave the RDF data listing the company's products for use with the next employee (from step (3)).

Figure 4:
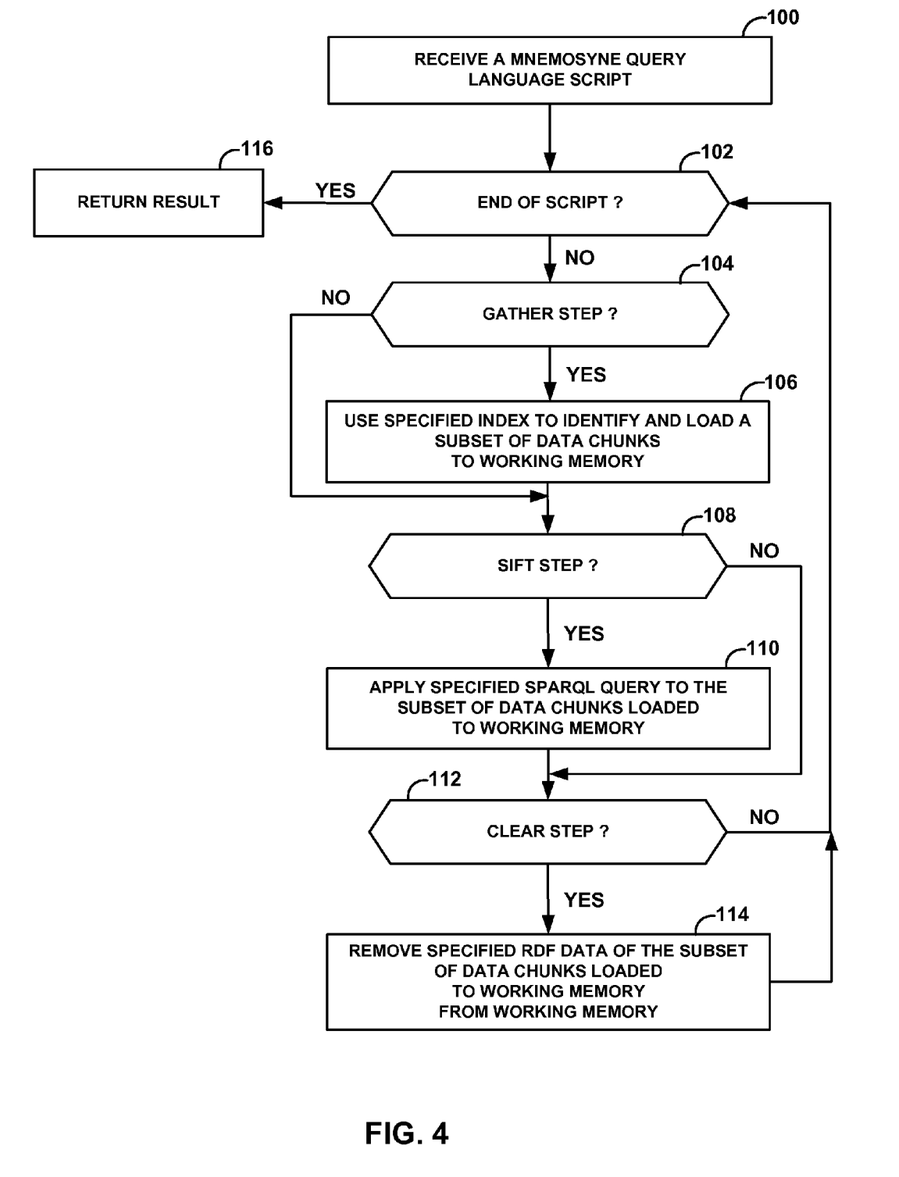
FIG. 4 is a flowchart illustrating an example mode of operation for an RDF database system that accords with techniques described in this disclosure.

FIG. 4 is a flowchart illustrating an example mode of operation for an RDF database system that accords with techniques described in this disclosure. This example operation is described with respect to RDF database system 12 of FIG. 2. Initially, query API 36 receives MQL script 45 from a requestor (100). MQL parser/evaluator 34 executes the MQL script including the Mnemosyne-specific primitives (gather, sift, and clear). If the end of the script is reached (YES branch of 102), MQL parser/evaluator 34 returns MQL script result 47 to the requestor (116).

If additional steps remain (NO branch of 102), and the next step is a gather step (YES branch of 104), then MQL parser/evaluator 34 uses one of indexes 46 via index API 44 to retrieve and load, via chunk storage API 40, one or more relevant chunks from chunk storage system 42 to in-memory RDF data 16 (106). The relevant chunks are a subset of all of the data chunks of an RDF database, as described by indexes 46.

If the next step is a sift step (YES branch of 108 or following step 106), SPARQL engine 14 applies a SPARQL query specified in the script to in-memory RDF data 16, which includes the loaded subset of data chunks (110). If the next step is a clear step (YES branch of 112), MQL parser/evaluator 34 removes RDF data, as specified by MQL script 45, from in-memory RDF data 16 (116). Otherwise (NO branch of 112), script execution continues (102).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:

receiving, with a database system, a first query and a second query for a Resource Description Framework (RDF) database that stores a plurality of data chunks to one or more storage drives, wherein each of the plurality of data chunks includes a plurality of triples that represent an RDF subgraph of the RDF database;

accessing a first index that indexes one or more of the data chunks to identify a first subset of the data chunks relevant to the first query, wherein the first index comprises keys defined by a first characteristic of the first subset of the data chunks;

loading the first subset of the data chunks to a main memory associated with the database system;

executing the first query only against triples included within the subset of the data chunks loaded to the main memory to obtain a query result for the first query;

based on the query result for the first query, accessing a second index to identify a second subset of the data chunks relevant to the second query, wherein the second index comprises keys defined by a second characteristic of the second subset of the data chunks;

loading the second subset of the data chunks to the main memory; and executing the second query only against triples included within the first subset of the data chunks and the second subset of the data chunks loaded to the main memory to obtain a query result for the second query.

2. The method of claim 1, wherein a first one of the first plurality of data chunks includes a first plurality of triples of the RDF database, wherein a second one of the first plurality of data chunks includes a second plurality of triples of the RDF database, wherein the first plurality of triples comprises a first RDF graph, wherein the second plurality of triples comprises a second RDF graph, wherein loading the first subset of the data chunks to a main memory comprises merging the first RDF graph and the second RDF graph to generate a combined RDF graph in the main memory, and wherein executing the first query comprises executing the first query only against the combined RDF graph.

3. The method of claim 1, wherein the second query depends on the query result for the first query.

4. The method of claim 1, wherein the first query comprises a graph pattern, and wherein the first query result comprises a subgraph of the labeled directed graph that matches the graph pattern.

5. The method of claim 1, wherein at least one of the triples included within the first subset of the data chunks loaded to the main memory does not match any part of the first query.

6. The method of claim 1, wherein a first one of the plurality of the data chunks and a second one of the plurality of the data chunks include a common one of the plurality of triples.

7. The method of claim 1, wherein the first index is distributed across multiple hosts.

8. The method of claim 1, wherein the first index comprises one or more key-value pairs that each comprises a key and a value that references a corresponding one of the plurality of data chunks.

9. The method of claim 1, further comprising:

using the query result of the first query to select at least one data chunk of the first subset of data chunks to be cleared from main memory prior to loading the second subset of the data chunks.

10. The method of claim 1, wherein a third index comprises keys defined by a third characteristic of the first subset of the data chunks, wherein identifying the first subset of the data chunks relevant to the first query comprises accessing the third index.

11. The method of claim 1, wherein a number of triples included in a first one of the plurality of data chunks is different than a number of triples included in a second one of the plurality of data chunks.

12. The method of claim 1, further comprising:

selecting fewer than all of the triples included within the first subset of the data chunks loaded to the main memory to be cleared; and freeing the main memory of the selected triples.

13. The method of claim 1, wherein the first query comprises a script comprising:

a gather step for identifying the first subset of the data chunks relevant to the first query and loading the first subset of the data chunks to the main memory;

a sift step for executing the first query only against triples included within the first subset of the data chunks loaded to the main memory; and a clear step for freeing the main memory of one or more of the triples included within the first subset of the data chunks loaded to the main memory.

14. The method of claim 13, wherein the sift step comprises executing a SPARQL Protocol and RDF Query Language (SPARQL) query included in the script against triples included within the first subset of the data chunks loaded to the main memory.

15. The method of claim 14, wherein the SPARQL query comprises a first SPARQL query, wherein the gather step comprises a first gather step and a second gather step, the method further comprising:

executing a second gather step for identifying the second subset of the data chunks and loading the second subset of the data chunks to the main memory; and executing a second SPARQL query included in the script against triples included within the second subset of the data chunks.

16. The method of claim 13, further comprising:

fragmenting the script into a plurality of script fragments; and sending one of the plurality of script fragments to a remote instance of the database system for execution, wherein the remote instance stores a data chunk relevant to executing the script fragment sent for execution.

17. The method of claim 16, further comprising:

receiving, with the database system, a query result fragment from the remote instance of the database system, wherein executing the first query only against triples included within the first subset of the data chunks loaded to the main memory to obtain the query result comprises merging the query result fragment with the first query result.

18. A database system comprising:

a Resource Description Framework (RDF) database that stores a plurality of data chunks to one or more storage drives, wherein each of the plurality of data chunks includes a plurality of triples that represent an RDF subgraph of the RDF database;

a main memory;

a query interface that receives a first query and a second query for the RDF database;

a query parser/evaluator that accesses a first index that indexes one or more of the data chunks to identify a first subset of the data chunks relevant to the first query, wherein the first index comprises keys defined by a first characteristic of the first subset of the data chunks;

an index interface that includes one or more bulk loaders that load the first subset of the data chunks to the main memory; and a SPARQL Protocol and RDF Query Language (SPARQL) engine that executes the first query only against triples included within the first subset of the data chunks loaded to the main memory to obtain a query result for the first query, wherein, based on the query result for the first query, the query parser/evaluator accesses a second index to identify a second subset of the data chunks relevant to the second query, wherein the second index comprises keys defined by a second characteristic of the second subset of the data chunks, wherein the one or more bulk loaders load the second subset of the data chunks to the main memory, wherein the SPARQL Protocol and RDF Query Language engine executes the second query only against triples included within the first subset of the data chunks and the second subset of the data chunks loaded to the main memory to obtain a query result for the second query.

19. The database system of claim 18, wherein the database system is distributed among a plurality of instances.

20. A non-transitory computer-readable storage device storing instructions for causing one or more programmable processors to:

receive, with a database system, a first query and a second query for a Resource Description Framework (RDF) database that stores a plurality of data chunks to one or more storage drives, wherein each of the plurality of data chunks includes a plurality of triples that represent an RDF subgraph of the RDF database;

access a first index that indexes one or more of the data chunks to identify a first subset of the data chunks relevant to the first query, wherein the first index comprises keys defined by a first characteristic of the first subset of the data chunks;

load the first subset of the data chunks to a main memory associated with the database system;

execute the first query only against triples included within the subset of the data chunks loaded to the main memory to obtain a query result for the first query;

based on the query result for the first query, access a second index to identify a second subset of the data chunks relevant to the second query, wherein the second index comprises keys defined by a second characteristic of the second subset of the data chunks;

load the second subset of the data chunks to the main memory; and execute the second query only against triples included within the first subset of the data chunks and the second subset of the data chunks loaded to the main memory to obtain a query result for the second query.

* * * * *